(12) United States Patent
Park et al.

(10) Patent No.: US 10,532,746 B2
(45) Date of Patent: Jan. 14, 2020

(54) VEHICLE AND CONTROLLING METHOD THEREOF

(71) Applicant: Hyundai Motor Company, Seoul (KR)

(72) Inventors: Jung Mi Park, Gyeonggi-do (KR); Hyunjin Kang, Seoul (KR); Jimin Han, Gyeonggi-do (KR); Jia Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 203 days.

(21) Appl. No.: 15/276,861

(22) Filed: Sep. 27, 2016

(65) Prior Publication Data

US 2017/0267252 A1 Sep. 21, 2017

(30) Foreign Application Priority Data

Mar. 21, 2016 (KR) ........................ 10-2016-0033162

(51) Int. Cl.
*B60W 40/09* (2012.01)
*B60W 50/14* (2012.01)
(Continued)

(52) U.S. Cl.
CPC ............ *B60W 40/09* (2013.01); *B60W 30/12* (2013.01); *B60W 30/14* (2013.01);
(Continued)

(58) Field of Classification Search
CPC ...... B60W 50/16; B60W 40/09; B60W 50/14; B60W 50/0098; B60W 50/00; B60W 30/12; B60W 30/16; B60W 30/025; B60W 10/20; B60W 10/18; B60W 10/04; B60W 30/14; B60W 30/182; B60W 50/082; B60W 50/087; B60W 2040/0827; B60W 2040/0872; B60W 2050/009; B60W 2540/00; B60W 2540/10; B60W 2540/12; B60W 2540/18; B60W 2540/22; B60W 2540/30; B60W 2550/20; B60W 2550/40; G08G 1/16; G08G 1/166; G08G 1/01; G08G 1/0129; G08G 1/0104; G08G 1/096716; B60R 16/0231; B60R 1/00;
(Continued)

(56) References Cited

U.S. PATENT DOCUMENTS 9,815,478 B2 * 11/2017 Tsuyunashi ........... B60W 40/09
2002/0184236 A1 * 12/2002 Donath ..................... B60R 1/00
(Continued)

FOREIGN PATENT DOCUMENTS

JP 2011-081640 A 4/2011
JP 2012-022565 A 2/2012
(Continued)

*Primary Examiner* — Behrang Badii
(74) *Attorney, Agent, or Firm* — Mintz Levin Cohn Ferris Glovsky and Popeo, P.C.; Peter F. Corless

(57) ABSTRACT

A vehicle that provides an advanced driver assistance system (ADAS) recommendation function and a method of controlling the vehicle are provided. The vehicle includes a collection unit that is configured to collect behavior information of a driver and a controller that is configured to determine an advanced driver assistance system (ADAS) mode recommendable to the driver based on the collected behavior information and to output the determined ADAS mode.

12 Claims, 11 Drawing Sheets

(51) Int. Cl.
*B60W 30/12* (2006.01)
*B60W 30/14* (2006.01)
*B60W 30/182* (2012.01)
*B60W 50/08* (2012.01)
*B60R 1/00* (2006.01)
*G06K 9/00* (2006.01)
*G06F 16/29* (2019.01)
*B60W 40/08* (2012.01)
*B60W 50/00* (2006.01)

(52) U.S. Cl.
CPC ........ *B60W 30/182* (2013.01); *B60W 50/082* (2013.01); *B60W 50/087* (2013.01); *B60W 50/14* (2013.01); *B60R 1/00* (2013.01); *B60W 2040/0827* (2013.01); *B60W 2040/0872* (2013.01); *B60W 2050/009* (2013.01); *B60W 2540/00* (2013.01); *B60W 2540/10* (2013.01); *B60W 2540/12* (2013.01); *B60W 2540/18* (2013.01); *B60W 2540/22* (2013.01); *B60W 2540/30* (2013.01); *B60W 2550/20* (2013.01); *B60W 2550/40* (2013.01); *G06F 16/29* (2019.01); *G06K 9/00* (2013.01)

(58) Field of Classification Search
CPC ................. B60R 1/088; B60R 1/12; B60R 11/04; B60C 23/0408; B60K 35/00; B60K 28/10; B60K 31/0008; G01C 21/3602; G01C 21/32; G01C 21/3638; G01C 21/26; G01C 21/36; G01C 21/365; G01C 21/00; B60N 2/976; G06K 9/00; G06K 9/00805; G09B 29/106; G09B 29/10; G05D 1/0231; G05D 1/0088; G06F 16/29; B60Q 9/00; B60Q 5/006; B60Q 1/2665; H04N 7/183; H04N 7/181; H04N 5/247; H04N 5/23293; H04N 5/265; G01S 13/865; G01S 13/862; G01S 13/867; G06T 5/006

See application file for complete search history.

(56) References Cited

U.S. PATENT DOCUMENTS

| | | | |
|---|---|---|---|
| 2005/0212667 A1* | 9/2005 | Lengning | G01C 21/36 340/439 |
| 2011/0118929 A1* | 5/2011 | Takae | B60W 50/16 701/31.4 |
| 2015/0211868 A1* | 7/2015 | Matsushita | G01C 21/32 701/457 |
| 2015/0284008 A1* | 10/2015 | Tan | B60W 50/0098 701/28 |
| 2015/0348418 A1* | 12/2015 | Pfeiffer | B62D 15/025 340/435 |
| 2016/0150070 A1* | 5/2016 | Goren | H04W 4/029 455/404.2 |
| 2016/0207540 A1* | 7/2016 | Liu | B60C 23/00 |

FOREIGN PATENT DOCUMENTS

| | | |
|---|---|---|
| JP | 2013-109447 A | 6/2013 |
| JP | 2015-175824 A | 10/2015 |
| JP | 2016-016765 A | 2/2016 |
| KR | 10-2014-0044036 A | 4/2014 |
| KR | 10-2015-0032598 A | 3/2015 |

* cited by examiner

VEHICLE AND CONTROLLING METHOD THEREOF

CROSS-REFERENCE TO RELATED APPLICATION(S)

This application claims the benefit of Korean Patent Application No. 10-2016-0033162, filed on Mar. 21, 2016 in the Korean Intellectual Property Office, the disclosure of which is incorporated herein by reference.

BACKGROUND

1. Field of Invention

The present disclosure relates to a vehicle and a method of controlling the same, and more particularly, to a vehicle that provides an advanced driver assistance system (ADAS) recommendation function and a method of controlling the vehicle.

2. Description of the Related Art

Advanced driver assistance system (hereinafter, referred to as ADAS), a system assisting a driver in driving process, reduces driver's fatigue and enhances safety of driving. Recently, functions of the ADAS have been developed. However, the ADAS has not been efficiently utilized since it is difficult for a driver to recognize or remember the purposes and effects of various functions thereof. Additionally, it is difficult for the driver to select and operate an ADAS function suitable for surrounding situations and behaviors of the driver in real time while driving a vehicle. Thus, the driver may be distracted and the risk of an accident may increase when the driver operates the ADAS functions while driving.

SUMMARY

Therefore, it is an aspect of the present disclosure to provide a vehicle providing an advanced driver assistance system (ADAS) mode recommendation function based on a driver's behavior pattern, and a method of controlling the vehicle. It is another aspect of the present disclosure to provide a vehicle providing an ADAS mode recommendation function based on real-time traffic information or information regarding expected driving situations. Additional aspects of the disclosure will be set forth in part in the description which follows and, in part, will be obvious from the description, or may be learned by practice of the disclosure.

A vehicle according to an aspect may include a collection unit configured to collect behavior information of a driver, a controller configured to determine an advanced driver assistance system (ADAS) mode recommendable to the driver based on the collected behavior information, and an output unit configured to output the determined ADAS mode.

According to an exemplary embodiment, the collection unit may include at least one selected from the group consisting of a sound collecting unit, an image collecting unit, a pressure sensor, a heat sensor, a force sensor, a heart rate sensor, and a humidity sensor. Additionally, the collection unit may be configured to collect at least one selected from the group consisting of information regarding whether a noise or vibration occurs in a front passenger seat or back seats and noise or vibration occurrence time, whether the driver gazes at a side mirror or a rear view mirror and gazing time, whether a body temperature of the driver changes, a variation in the driver's body temperature, and body temperature changing time, a size and shape of pupils of the driver, an angle of a steering wheel, whether an accelerator or a brake pedal is engaged and operating time of the accelerator or the brake pedal, whether a multimedia is manipulated and manipulation time, and whether a hands-free device is manipulated and manipulation time, a heart rate variation of the driver, and a variation in skin conductance of the driver.

Further, the output unit may be configured to output an explanation regarding the ADAS mode. The output unit may include at least one selected from the group consisting of a display unit and a sound output unit. The vehicle may further include a communication unit configured to receive traffic information from an external traffic information collecting device. The traffic information collecting device may include at least one selected from the group consisting of an image sensing device, a vehicle detection system (VDS), a fire detector, and smoke removing facilities.

In particular, the communication unit may be configured to receive traffic information from a server of an intelligent transport system (ITS). The controller may be configured to determine an ADAS mode recommendable to the driver based on the traffic information received by the communication unit. The controller may further be configured to determine at least one ADAS mode selected from the group consisting of Smart Cruse Control (SCC), Advanced Smart Cruse Control (ASCC), Lane Keeping Assist System (LKAS), Smart Parking Assist System (SPAS), Advanced Smart Parking Assist System (ASPAS), Traffic Jam Assist (TJA), Autonomous Emergency Braking System (AEB), Highway Driving Assist (HAD), Forward Collision Warning System (FCWS), Emergency Stop System (ESS), Hill Start Assist Control System (HAC), Lane Departure Warning System (LDWS), Blind Spot Detection (BSD), and Narrow Path Assist (NPA) modes, based on the collected behavior information.

A method of controlling a vehicle according to an aspect may include collecting behavior information of a driver, determining an advanced driver assistance system (ADAS) mode recommendable to the driver based on the collected behavior information, and outputting the determined ADAS mode. The collecting of the behavior information of the driver may include collecting at least one selected from the group consisting of information regarding whether a noise or vibration occurs in a front passenger seat or back seats and noise or vibration occurrence time, whether the driver gazes at a side mirror or a rear view mirror and gazing time, whether a body temperature of the driver changes, a variation in the driver's body temperature, and body temperature changing time, a size and shape of pupils of the driver, an angle of a steering wheel, whether an accelerator or a brake pedal is engaged and operating time of the accelerator or the brake pedal, whether a multimedia is manipulated and manipulation time, and whether a hands-free device is manipulated and manipulation time, a heart rate variation of the driver, and a variation in skin conductance of the driver.

According to an exemplary embodiment, the collecting of the behavior information of the driver may further include determining behavior information of the driver based on pre-stored behavior information of the driver. The outputting of the determined ADAS mode may include outputting the ADAS mode and explanations regarding the ADAS mode. The method may further include receiving traffic information from an external traffic information collecting device and receiving traffic information from a server of an intelligent transport system (ITS).

The determining of the ADAS mode recommendable to the driver based on the collected behavior information may include determining at least one ADAS mode selected from the group consisting of Smart Cruse Control (SCC), Advanced Smart Cruse Control (ASCC), Lane Keeping Assist System (LKAS), Smart Parking Assist System (SPAS), Advanced Smart Parking Assist System (ASPAS), Traffic Jam Assist (TJA), Autonomous Emergency Braking System (AEB), Highway Driving Assist (HAD), Forward Collision Warning System (FCWS), Emergency Stop System (ESS), Hill Start Assist Control System (HAC), Lane Departure Warning System (LDWS), Blind Spot Detection (BSD), and Narrow Path Assist (NPA) modes, based on the collected behavior information.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
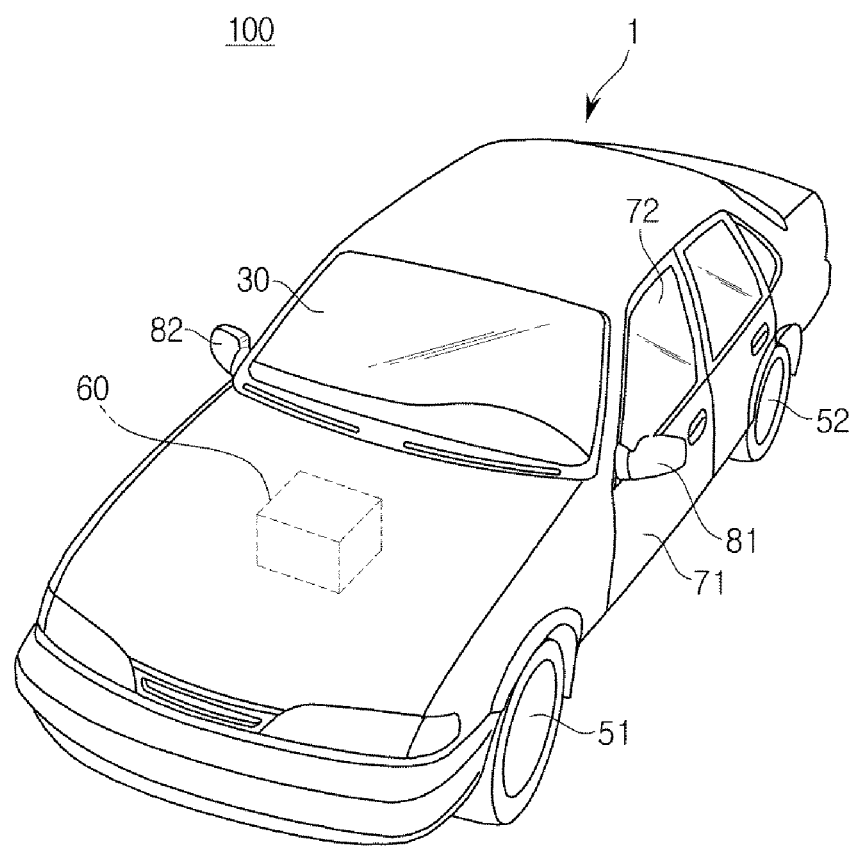
FIG. 1 is an exterior view of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present disclosure, examples of which are illustrated in the accompanying drawings, wherein like reference numerals refer to like elements throughout.

Hereinafter, a vehicle and a method of controlling the same will be described in detail with reference to the accompanying drawings.

FIG. 1 is an exterior view of a vehicle 100 according to an exemplary embodiment. Referring to FIG. 1, the vehicle 100 may include a body 1 that defines an appearance of the vehicle 100, a front glass configured to provide a driver sitting in the vehicle 100 with a forward view of the vehicle 100, wheels 51 and 52 configured to move the vehicle 100, a driving device 60 configured to rotate the wheels 51 and 52, doors 71 configured to shield the inside of the vehicle 100 from the outside, and side mirrors 81 and 82 configured to provide the driver with rear views of the vehicle 100.

The front glass 30 may be disposed at a front upper portion of the body 1 to allow the driver sitting in the vehicle 100 to acquire visual information regarding the forward view of the vehicle 100 and is also referred to as a windshield glass. The wheels 51 and 52 include front wheels 51 disposed at front portions of the vehicle 100 and rear wheels 52 disposed at rear portions of the vehicle 100. The driving device 60 may provide rotational force to the front wheels 51 and the rear wheels 52 to move the body 1 forward or backward. The driving device 60 may include an engine configured to generate the rotational force by combustion of fossil fuels or a motor configured to generate the rotational force by receiving power from a capacitor (not shown).

Further, the doors 71 may be pivotally coupled to the body 1 at left and right sides and the driver may enter the vehicle 100 by opening the door 71, and the inside of the vehicle 100 may be shielded from the outside by closing the door 71. The doors 71 may include windows 72 through which the inside of the vehicle 100 is visible and vice versa. According to an exemplary embodiment, either the inside or the outside of the vehicle 100 may be visible through the window 72, and the windows 72 may be opened and closed. The side mirrors 81 and 82 include a left side mirror 81 disposed at the left side of the body 1 and a right side mirror 82 disposed at the right side of the body 1, and allow the driver sitting in the vehicle 100 to acquire visual information regarding sides and the rear of the vehicle 100.

Figure 2:
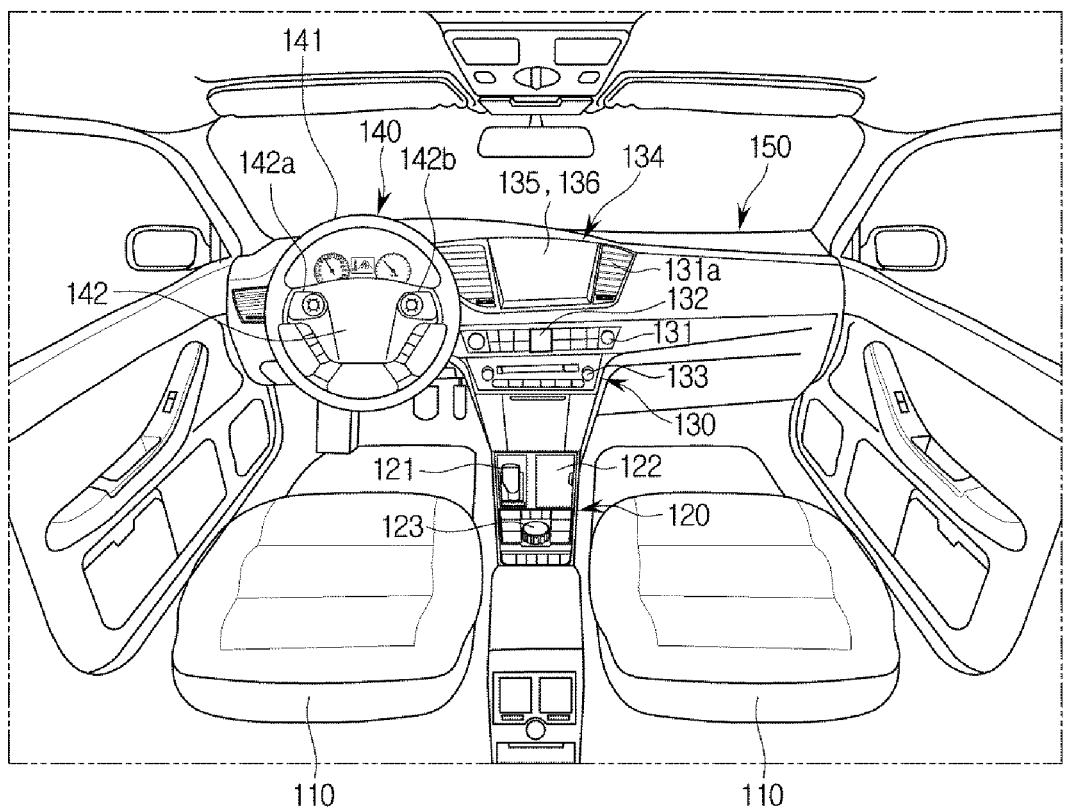
FIG. 2 is an interior view of the vehicle according to an exemplary embodiment.

FIG. 2 is an interior view of the vehicle 100 according to an exemplary embodiment. Referring to FIG. 2, the vehicle 100 may include a plurality of seats in which the driver and a passenger sit (e.g. are accommodated), a gear box 120, and a dashboard 150 provided with a steering wheel 140 and a center fascia 130. The gear box 120 may include a transmission lever 121 to shift gears of the vehicle 100 and a touch pad 122 to execute operations of the vehicle 100. Meanwhile, when required, a dial controller 123 may be selectively installed therein.

The center fascia 130 may include an air conditioner 131, a clock 132, an audio device 133, an audio, video, navigation (AVN) device 134, and the like. The air conditioner 131 may be configured to maintain the inside of the vehicle 100 at a desired temperature by adjusting temperature, humidity, cleanness of air, and air flow inside the vehicle 100. The air conditioner 131 may include at least one discharge port 131a installed in the center fascia 130 and configured to discharge air. The center fascia 130 may include a button or dial to operate the air conditioner 131. A user such as the driver may operate the air conditioner 131 using the button disposed at the center fascia 130. The clock 132 may be disposed near (e.g., proximate to) the button or dial to operate the air conditioner 131.

Additionally, the audio device 133 may include a control panel on which a plurality of buttons to perform functions of the audio device 133 may be disposed. The audio device 133 may provide a radio mode to provide radio functions and a media mode to reproduce audio files of various storage media including the audio files. The AVN device 134 may be embedded in the center fascia 130 of the vehicle 100. The AVN device 134 may be configured to execute an overall operation of audio functions, video functions, and navigation functions based on a user's manipulation. The AVN device 134 may include an input unit 135 to receive a user's command regarding the AVN device 134 and a display 136 to display a screen related to the audio functions, video functions, or navigation functions. The display 136 of the AVN device 134 may provide an advanced driver assistance system (ADAS) mode recommendation screen. This will be described later in detail.

The steering wheel 140 to control a driving direction of the vehicle 100 may include a rim 141 gripped by the driver and a spoke 142 connected to a steering device of the vehicle 100 and connecting the rim 141 with a hub of a rotating shaft for steering. The spoke 142 may include manipulators 142a and 142b to operate various devices of the vehicle 100, for example, the audio device 133. The dashboard 150 may further include an instrument cluster to provide various driving-related information such as a driving speed of the vehicle 100, an engine revolutions per minute (RPM), and a fuel level and to the driver, and a glove compartment for miscellaneous storage.

Figure 3:
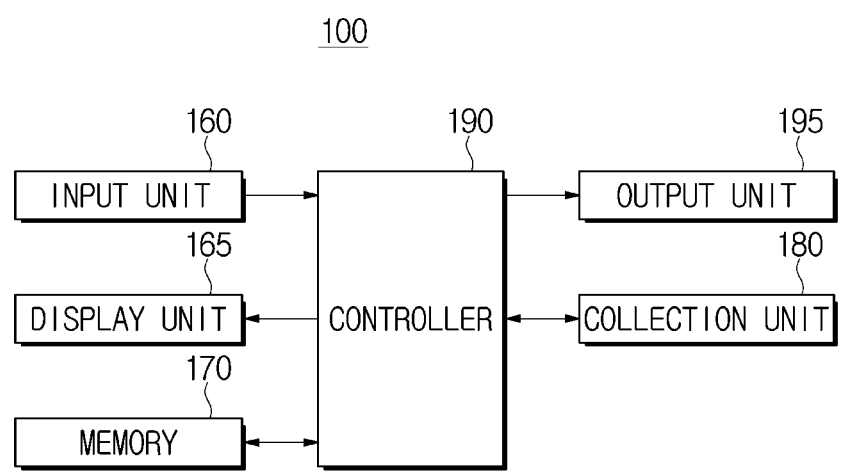
FIG. 3 is a control block diagram of the vehicle according to an exemplary embodiment of the present disclosure.
Figure 4:
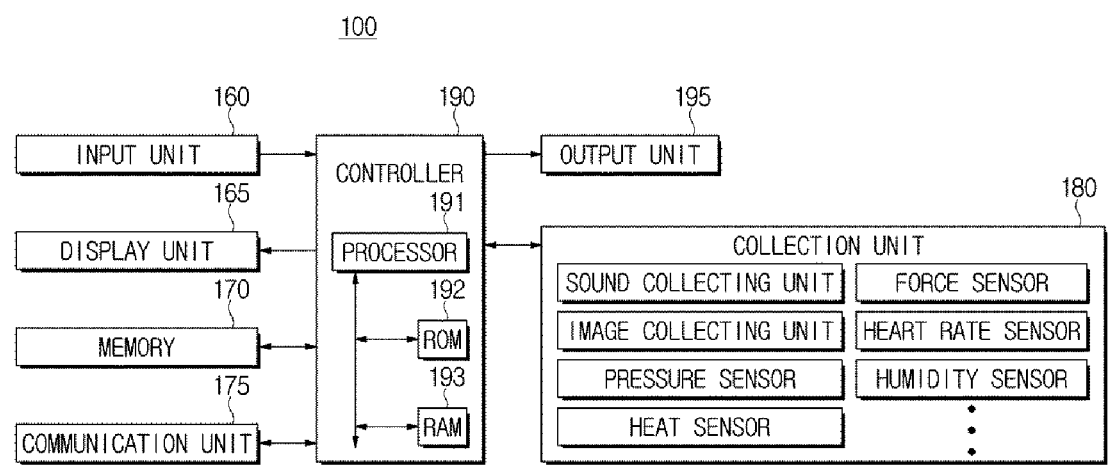
FIG. 4 is a detailed control block diagram of the vehicle according to an exemplary embodiment of the present disclosure.

Hereinafter, the vehicle 100 according to an exemplary embodiment will be described in more detail with reference to FIGS. 3 and 4. FIG. 3 is a control block diagram of the vehicle 100 according to an exemplary embodiment. FIG. 4 is a detailed control block diagram of the vehicle 100 according to an exemplary embodiment. Referring to FIGS. 3 and 4, the vehicle 100 according to an exemplary embodiment may include an input unit 160, a display unit 165, a memory 170, a communication unit 175, a collection unit 180, a controller 190, and an output unit 195. The controller 190 may be configured to operate the other components of the vehicle.

Particularly, the input unit 160 may be configured to receive a control signal to operate various functions of the vehicle 100 from a user and transmit the input control signal to the controller 190. For example, the input unit 160 may be configured to receive a command to select a function on an ADAS mode recommendation screen from the user and transmit the input control signal to the controller 190. The input unit 160 may be implemented using a touch panel together with the display unit 165 of the AVN device 134. However, the input unit 160 is not limited thereto. The display unit 165 may be configured to display a screen related to functions being performed in the vehicle 100. For example, the display unit 165 may be configured to display an ADAS mode recommendation screen. The ADAS mode recommendation screen may provide one or a plurality of recommended functions, guide messages regarding the recommended functions may also be provided therewith according to an exemplary embodiment.

The display unit 165 may include the display 136 of the AVN 134. In particular, the display unit 165 may employ a light emitting diode (LED), an organic light emitting diode (OLED), or a liquid crystal display (LCD), without being limited thereto. The display unit 165 may be integrated with the input unit 160 or independently prepared. The display unit 165 may include any visual unit that may provide the ADAS mode recommendation to the user such as a head-up display and an instrument cluster in addition to the display 136 of the AVN device 134.

The memory 170 may be configured to store a variety of data, programs, or applications to drive and operate the vehicle 100. More particularly, the memory 170 may be configured to store control programs to operate the vehicle 100, specialized applications initially provided by a manufacturer, or general purpose applications downloaded from external sources. For example, the memory 170 may be configured to store ADAS function providing programs or applications provided by the vehicle 100 and store ADAS function recommending programs or applications to recommend an ADAS function suitable for the driver.

The ADAS may have various modes based on types of operating sensors and target driving situations. For example, the ADAS may include Smart Cruse Control (SCC), Advanced Smart Cruse Control (ASCC), Lane Keeping Assist System (LKAS), Smart Parking Assist System (SPAS), Advanced Smart Parking Assist System (ASPAS), Traffic Jam Assist (TJA), Autonomous Emergency Braking System (AEB), Highway Driving Assist (HAD), Forward Collision Warning System (FCWS), Emergency Stop System (ESS), Hill Start Assist Control System (HAC), Blind Spot Detection (BSD), and Narrow Path Assist (NPA) modes, and the like. However, the ADAS modes provided by the vehicle 100 according to an exemplary embodiment of the present disclosure are not limited to these examples. These examples of the ADAS mode will be described in more detail.

The SCC and ASCC modes may automatically adjust a distance from another vehicle ahead (e.g., a vehicle traveling in a forward direction of a subject vehicle) without driver manipulation or engagement of an accelerator or a brake system and may provide automatic stop and go functions based on traffic flow. The LKAS mode may provide a function of returning the vehicle 100 to an original driving lane by automatically operating a steering wheel when the vehicle 100 deviates from a traveling lane due to distracted or drowsy driving of a driver. The SPAS and ASPAS modes may provide parking assisting functions by automatically operating a steering wheel after searching for a parking space. The TJA mode may provide automatic acceleration or braking functions, when required, change a driving lane, in traffic-jam conditions.

Further, the AEB mode may provide automatic braking functions in unexpected emergency situations, for example, when another vehicle ahead (e.g., a preceding vehicle) suddenly stops or a person suddenly approaches to the vehicle 100. The HAD mode may provide automatic acceleration and braking functions on a highway. The ESS mode may provide automatic acceleration and braking functions or a function of pulling over onto a shoulder of a road by operating steering of the vehicle 100 in an emergency situation. The NPA mode may provide automatic acceleration and braking functions or steering functions of the vehicle 100 in a narrow lane.

The memory 170 may be configured to store information received by the communication unit 175 or information collected by the collection unit 180. Information stored in the memory 170 may be provided to operation processes of ADAS mode recommendation programs or applications upon request of the controller 190. The memory 170 may include at least one storage medium selected from the group consisting of a flash memory, a hard disc, a memory card, a read-only memory (ROM), a random access memory (RAM), an electrically erasable programmable read-only memory (EEPROM), a programmable read-only memory (PROM), a magnetic memory, a magnetic disc, and an optical disc. However, the memory is not limited thereto.

The communication unit 175 may be configured to receive external traffic information from a traffic information collecting device, and the received traffic information may be transmitted to the controller 190 to be provided to an ADAS mode recommendation process. The traffic information collecting device may include an image sensing device configured to automatically sense dangerous situations using CCTV cameras, a vehicle detection system (VDS) configured to acquire traffic information such as volume, speed, and occupancy data for each detected lane, a fire detector, smoke removing facilities, and the like. Additionally, the communication unit 175 may be configured to receive external traffic information from a server of an intelligent transport system (ITS), and the received traffic information may be transmitted to the controller 190 to be provided to the ADAS mode recommendation process.

Particularly, the ITS refers to a comprehensive traffic information system to efficiently cope with traffic problems by applying electric, electronic, information, communication, and automobile technologies to the field of transportation. The ITS aims to provide smooth traffic flows (e.g., improve traffic congestion) by collecting traffic-related information such as information regarding roads, vehicles, and drivers throughout the nation, weather information, information about road conditions, processing the collected information, and transmitting the processed information to a traffic terminal of a roadside, and a communication terminal of the vehicle 100 via wired or wireless communication networks.

The ITS may provide Advanced Traffic Control (ATC), Advanced Incident Management (AIM), Traffic & Road Information Service (TRIS), Advanced Highway System (AHS), and Route Guidance Service (RGS) functions. Functions of the ITS will be described in detail. The ATC may provide functions of automatically controlling signal time, highway entrance, and the like in response to a change in traffic volume in real time.

The AIM may be configured to recognize various emergency situations such as a traffic accident, breakdown of the vehicle, traffic congestion, and the like. The TRIS may be configured to collect and analyze traffic information and transmit the analyzed traffic information to various media. The AHS may provide a road facility intelligent function in which it is configured to collect information regarding road surfaces and surroundings of roads using various sensors and generate appropriate warnings output to a driver. The RGS may provide a driver with an optimal path to a target area based on traffic conditions using a vehicle navigation device.

The communication unit 175 may be configured to receive external traffic information from the server of the ITS and transmit the received traffic information to the controller 190. The controller 190 may then be configured to recommend an ADAS mode suitable for a situation based on the traffic information received from the ITS. The collection unit 180 may be configured to collect behavior information of the driver. The collected information may be transmitted to the controller 190 to be provided to the ADAS mode recommendation process. More particularly, the collection unit 180 may be configured to collect information regarding whether a noise or vibration occurs in a front passenger seat or back seats and noise or vibration occurrence time, whether the driver gazes at a side mirror or a rear view mirror and gazing time, whether a body temperature of the driver changes, a variation in the driver's body temperature, and body temperature changing time, a size and shape of pupils of the driver, an angle of the steering wheel, whether an accelerator or a brake pedal is engaged and operating time of the accelerator or the brake pedal, a heart rate variation of the driver, a variation in skin conductance of the driver, whether a multimedia is manipulated and manipulation time, and whether a hands-free device is manipulated and manipulation time.

The collection unit 180 may further be configured to collect the aforementioned information using a sound collecting unit, an image collecting unit, a pressure sensor, a heat sensor, a force sensor, a heart rate sensor, a humidity sensor, and the like. In particular, the sound collecting unit may include a microphone, and the image collecting unit may include an imaging device (e.g., a camera, video camera, or the like).

A method of collecting information by the collection unit 180 will be described in more detail. The noise of the front passenger seat or back seats may be collected by the sound collecting unit, and the vibration may be collected by the pressure sensor. The sound collecting unit may be implemented using a single microphone or a plurality of microphones, and the pressure sensor may be installed at the seat 110 or a seat belt. In addition, whether the driver gazes at a side mirror or a rear view mirror and gazing time may be analyzed using image information collected by the image collecting unit. Various imaging devices or cameras of the image collecting unit may be installed toward the side mirrors or the rear view mirror, or toward the driver according to an exemplary embodiment.

Furthermore, whether the body temperature of the driver changes, the variation in the driver's body temperature, and body temperature changing time may be analyzed by the heat sensor or using image information collected by the cameras of the image collecting unit. In this regard, the heat sensor may be installed at the seat 110, the seat belt, or the steering wheel 140, and an infrared camera may be used therefor. The information collected by the heat sensor or the image collecting unit may be transmitted to the controller 190, and the controller 190 may be configured to provide the collected information regarding body temperature of the driver to the ADAS mode recommendation process. For example, when the body temperature variation of the driver is greater than a predetermined reference value, the controller 190 may be configured to determine that the driver is physically fatigued and recommend the ESS mode.

The size and shape of pupils of the driver may be analyzed using image information collected by the cameras of the image collecting unit. The image collecting unit may be configured to transmit the collected information to the controller 190. The controller 190 may then be configured to provide the collected information about the pupils to the ADAS mode recommendation process. For example, when the size of the pupils of the driver is maintained less than a predetermined reference value for a predetermined time period, the controller 190 may be configured to determine that the driver drives while drowsy and recommend the ESS mode.

The angle of the steering wheel 140 may be analyzed using image information collected by the image collecting unit. The angle of the steering wheel 140 may be analyzed using sensing value information of the force sensor. In this regard, the force sensor may be installed around a rotational shaft of the steering wheel 140. The image collecting unit or the force sensor may be configured to transmit collected information to the controller 190, and the controller 190 may then be configured to provide the collected angle of the steering wheel 140 to the ADAS mode recommendation process.

Whether the accelerator or the brake pedal is engaged and operating time of the accelerator or the brake pedal, whether the multimedia is manipulated and manipulation time, and whether the hands-free device is manipulated and manipulation time may be analyzed using control signals of the vehicle 100. For example, when a periodic manipulation pattern of the accelerator or the brake pedal is sensed based on the control signals of the vehicle 100, the controller 190 may be configured to determine that the vehicle 100 is driven on a highway and recommend the HAD mode.

The heart rate variation of the driver may be analyzed using sensing value information of the heart rate sensor installed at the steering wheel 140, the seat 110, or the seat belt, or may be analyzed using image information collected by the cameras of the image collecting unit according to an exemplary embodiment. The heart rate sensor or the image collecting unit may be configured to collect information regarding heart rate variations of the driver and transmit the collected information to the controller 190. The controller 190 may then be configured to provide the degree of anxiety analyzed based on the received heart rate variation information to the ADAS mode recommendation process.

The variation in skin conductance of the driver may be analyzed using sensing value information of the humidity sensor installed at the steering wheel 140, the seat 110, or the seat belt. The humidity sensor may be configured to collect information regarding perspiration from the driver's skin and transmit the information to the controller 190. The controller 190 may then be configured to analyze the degree of anxiety of the driver based on the information regarding perspiration received from the humidity sensor and provide the analyzed degree of anxiety of the driver to the ADAS mode recommendation process.

The controller 190 may be configured to execute the overall operation of the vehicle 100 and adjust signal flows between internal elements of the vehicle 100 and perform data processing. When analyzed information satisfies user's inputs or predetermined conditions, the controller 190 may be configured to execute programs, applications, and the like stored in the memory 170. The controller 190 may include a processor 191, a ROM 192 to store control programs or application to operate the vehicle 100, and a RAM 193 to store signals or data input from external devices or used as a storage corresponding to various operations performed in the vehicle 100. Hereinafter, the ROM 192 and the RAM 193 of the controller 190 may include a ROM (not shown) and a RAM (not shown) of the memory 170.

For example, when an input button to execute a specific ADAS function is selected by the user, the controller 190 may be configured to execute the selected function. In particular, the controller 190 may be configured to analyze information regarding a current driving situation or an expected driving situation of the vehicle 100 based on information received from the communication unit 175 and recommend an ADAS mode suitable for the situation based on the analyzed information. For example, upon determination that a vehicle ahead suddenly stops based on the information received from the communication unit 175, the controller 190 may be configured to recommend the AEB mode. Meanwhile, the AEB mode may be executed at the same time as recommended for driver's safety.

The controller 190 may also be configured to recommend the ADAS mode suitable for the situation based on information collected by the collection unit 180. For example, when a uniform pattern of manipulating the accelerator and the brake pedal is sensed and the variation in skin conductance of the driver is within a predetermined reference range based on the information collected by the collection unit 180, the controller 190 may be configured to determine that the vehicle 100 is driven on a highway and recommend the HAD mode.

As described above, the controller 190 may be configured to recommend the ADAS mode suitable for the situation based on information received from the communication unit 175 or the collection unit 180. However, the controller 190 may also be configured to recommend the ADAS mode suitable for the situation based on information respectively received from the communication unit 175 and the collection unit 180 according to an exemplary embodiment. The output unit 195 may be configured to output an ADAS mode recommendable to the driver based on a control of the controller 190. Particularly, the output unit 195 may be configured to output the ADAS mode in a visible or audible manner. For example, the output unit 195 may include the display unit 165 and a sound output unit. In this regard, descriptions of the display unit 165 presented above will not be repeated herein.

The sound output unit may be configured to output the recommendable ADAS mode as a sound. The sound output unit may also be configured to output an explanation regarding the ADAS mode (e.g., guide messages, execution method, and the like) together with the recommendable ADAS mode in accordance with user's settings. The sound output unit may include a speaker installed within the vehicle 100, without being limited thereto.

Figure 5:
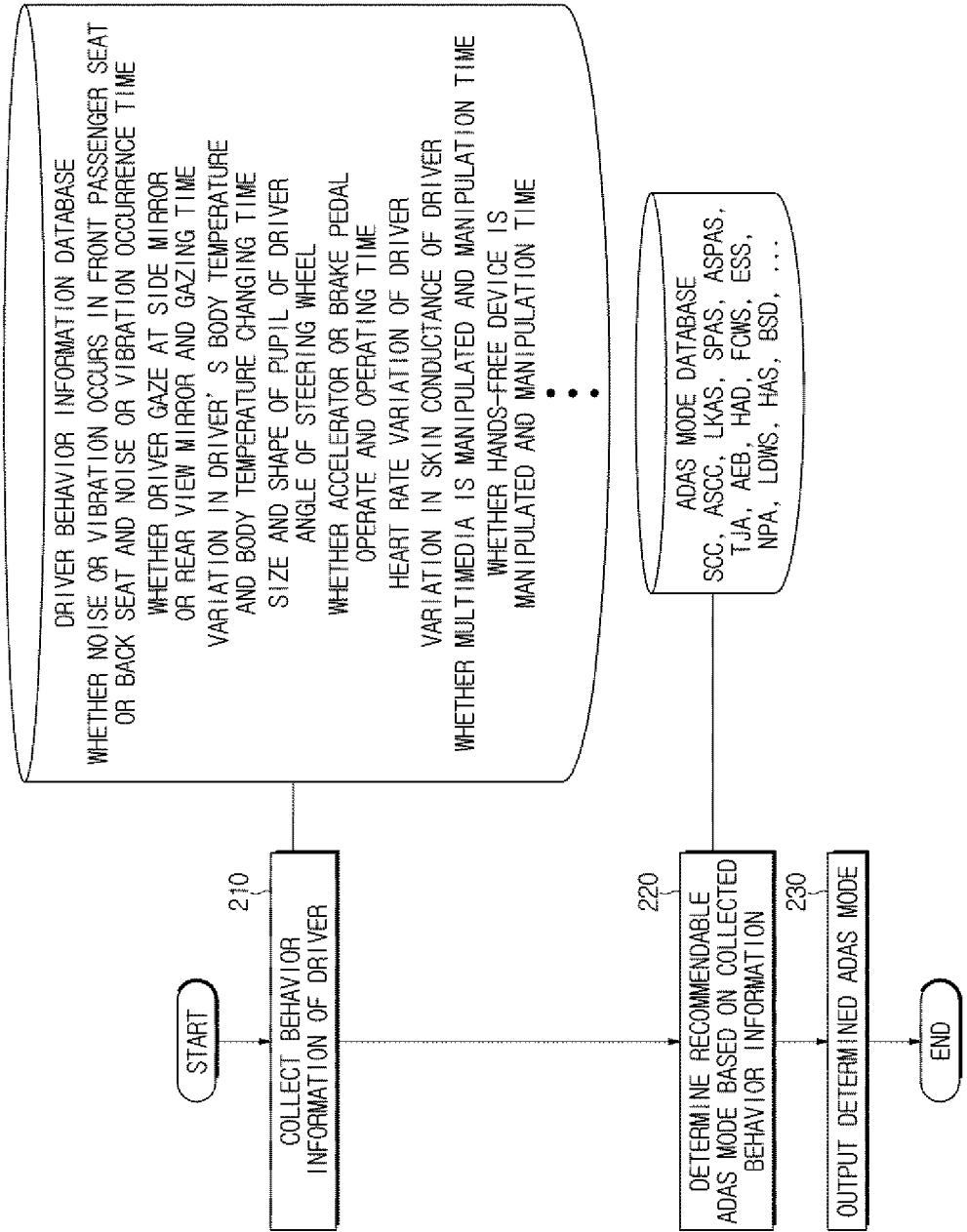
FIG. 5 is a flowchart illustrating a method of controlling the vehicle according to an exemplary embodiment of the present disclosure.
Figure 8:
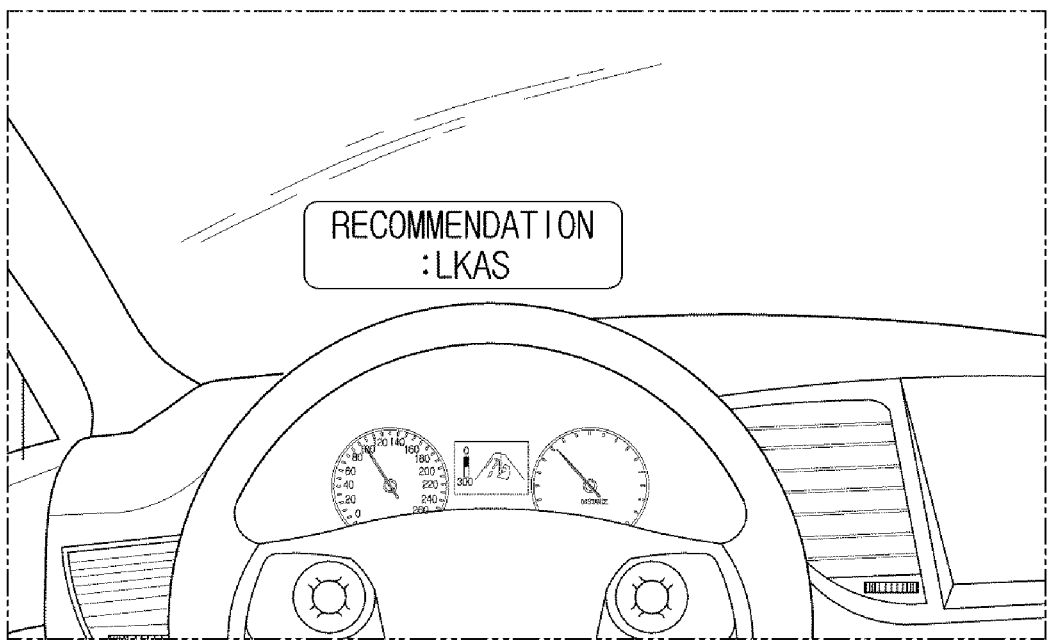
Figure 9:
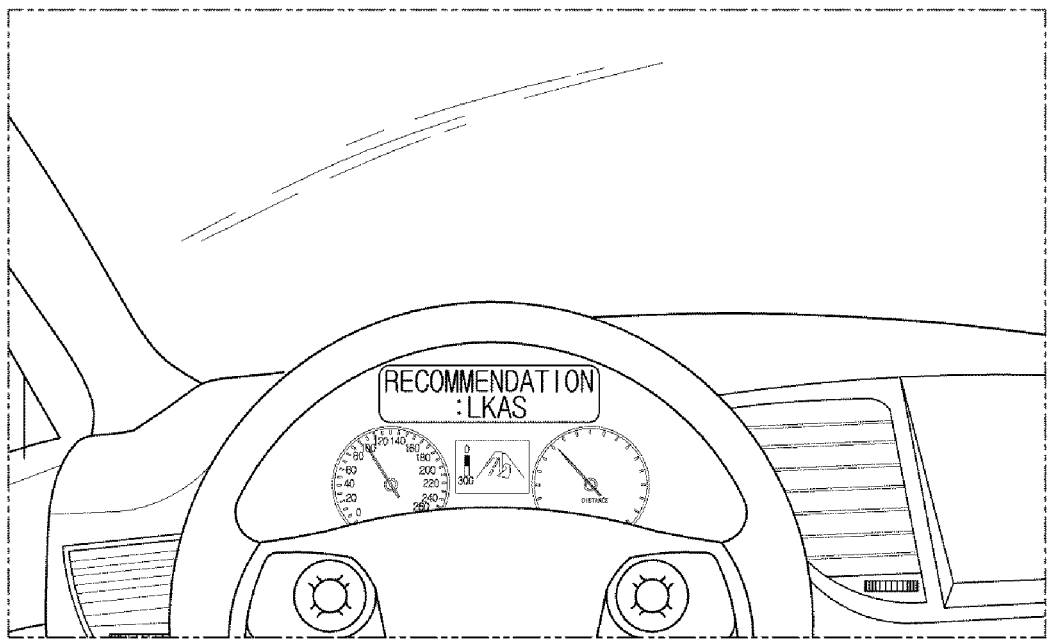
Figure 10:
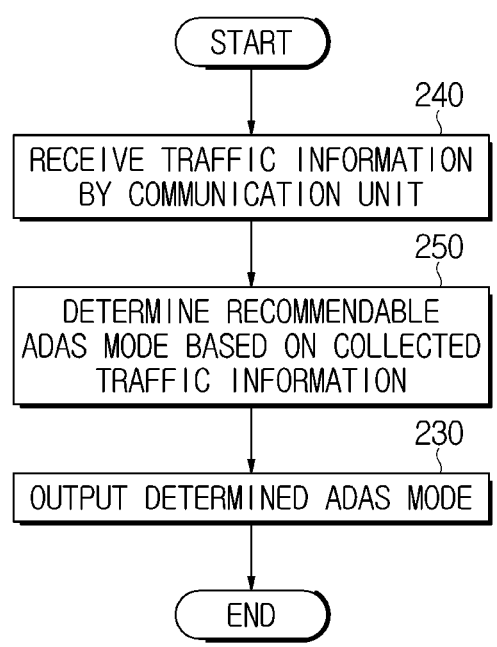
FIG. 10 is a flowchart illustrating a method of controlling the vehicle according to another exemplary embodiment of the present disclosure.
Figure 11:
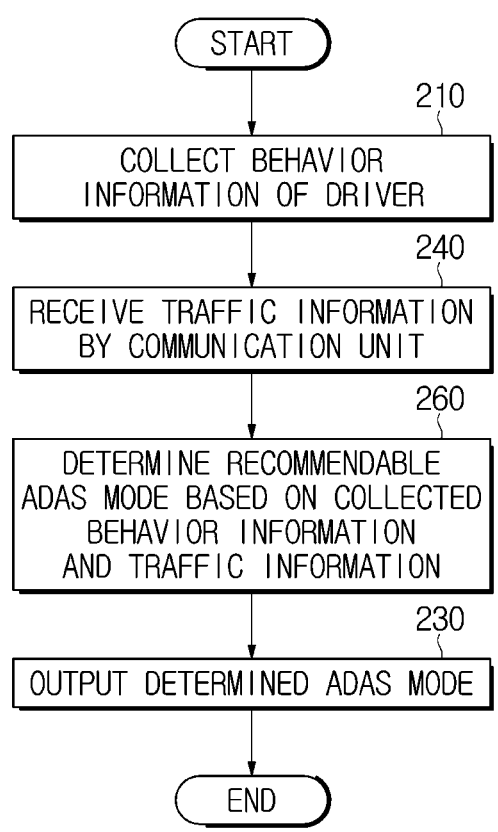
FIG. 11 is a flowchart illustrating a method of controlling the vehicle according to another exemplary embodiment of the present disclosure.

Various exemplary embodiments of the vehicle 100 are described above. Hereinafter, a method of controlling the vehicle 100 will be described. FIG. 5 is a flowchart illustrating a method of controlling the vehicle 100 according to an exemplary embodiment. FIGS. 6 to 9 are views exemplarily illustrating ADAS mode recommendation screens. FIG. 10 is a flowchart illustrating a method of controlling the vehicle 100 according to another exemplary embodiment. FIG. 11 is a flowchart illustrating a method of controlling the vehicle 100 according to another exemplary embodiment. The method described herein below may be executed by the controller.

Referring to FIG. 5, the method of controlling the vehicle 100 may include collecting and determining behavior information of a driver (210), determining an ADAS mode recommendable to the driver based on the behavior information of the driver (220), and outputting the determined ADAS mode (230). The collecting of the behavior information of the driver may include collecting behavior information of the driver using the collection unit 180 (210). As described above, the collection unit 180 may include at least one of the sound collecting unit, the image collecting unit, the pressure sensor, the heat sensor, the force sensor, the heart rate sensor, and the humidity sensor. In this regard, the sound collecting unit may include a microphone, and the image collecting unit may include a camera.

In particular, the collection unit 180 may be configured to collect information regarding whether a noise or vibration occurs in a front passenger seat or back seats and noise or vibration occurrence time, whether the driver gazes at a side mirror or a rear view mirror and gazing time, whether a body temperature of the driver changes, a variation in the driver's body temperature, and body temperature changing time, a size and shape of pupils of the driver, an angle of the steering wheel, whether an accelerator or the brake pedal is engaged and operating time of the accelerator or the brake pedal, a heart rate variation of the driver, a variation in skin conductance of the driver, whether a multimedia is manipulated and manipulation time, and whether a hands-free device is manipulated and manipulation time. Meanwhile, examples of the information collected by the collection unit 180 are not limited thereto, and the collection unit 180 may also be configured to collect various other behavior information suitable for recommending the ADAS mode in addition to the aforementioned behavior information.

Meanwhile, the collecting of the behavior information of the driver may further include determining behavior information of the driver based on pre-stored behavior information of the driver (210). For example, the behavior information of the driver may be pre-stored in the memory 170. According to an exemplary embodiment, behavior information of the driver collected by the collection unit 180 may further be stored in the memory 170. When the collection unit 180 collects the behavior information of the driver, the controller 190 may be configured to determine the behavior information of the driver by comparing the collected behavior information of the driver and the behavior information of the driver stored in the memory 170.

Further, the determining of an ADAS mode recommendable to the driver based on the behavior information of the driver may be performed (220). The determining of the ADAS mode recommendable to the driver may include determining an ADAS mode suitable for execution in a current situation among various ADAS modes stored in the memory 170. In other words, an ADAS mode suitable for the current situation may be determined based on an ADAS database stored in the memory 170. Examples of the ADAS modes stored in the memory 170 include ASCC, LKAS, ASPAS, TJA, AEP, HAD, ESS, NPA, Lane Departure Warning System (LDWS), and FCW modes. In this regard, descriptions of the detailed functions of the ADAS modes presented above will not be repeated herein. This operation may be performed by a pre-stored program or in accordance with conditions manually preset by the user. The determined ADAS may then be output (230). The outputting of the determined ADAS mode may include outputting an ADAS mode recommendation screen to the display unit 165.

Figure 6:
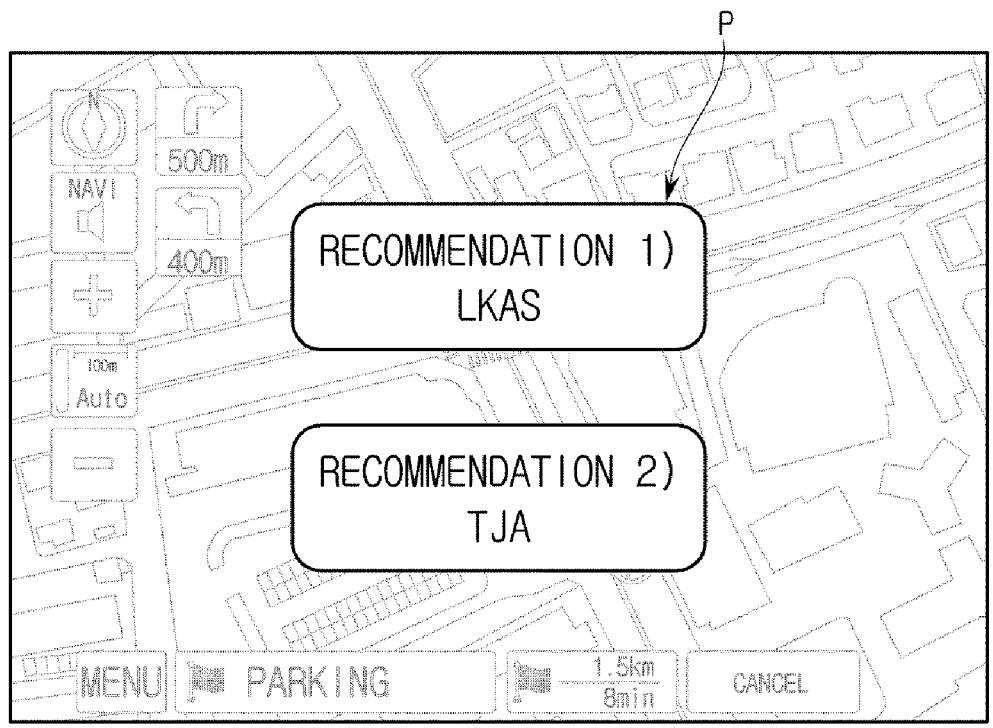
FIGS. 6 to 9 are views exemplarily illustrating ADAS mode recommendation screens according to an exemplary embodiment of the present disclosure.
Figure 7:
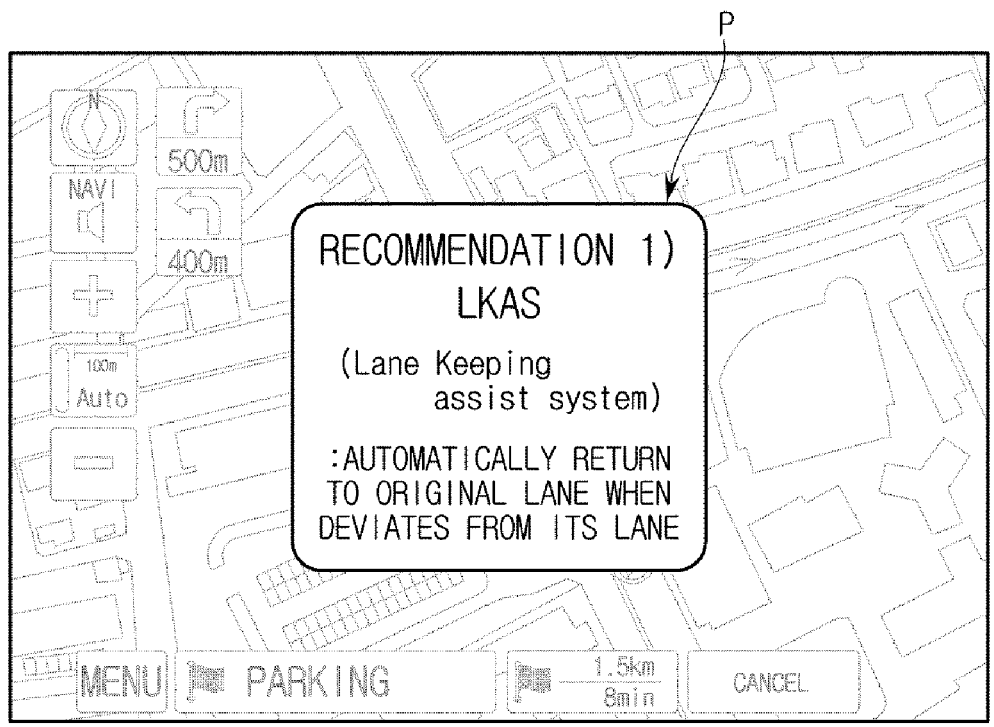

FIGS. 6 to 9 are views exemplarily illustrating ADAS mode recommendation screens. More particularly, FIGS. 6 and 7 are views exemplarily illustrating ADAS mode recommendation screens output to the display 136 of the AVN device 134. Referring to FIG. 6, the mode recommendation screen may output a pop-up window P that displays the recommendable ADAS mode. When the recommendable ADAS mode is output through the pop-up window P, a previously output screen may remain output on the screen at the bottom thereof in an inactive state (e.g., phased out, in a different color, or the like). Meanwhile, the mode recommendation screen may output a plurality of recommendable ADAS modes according to an exemplary embodiment. Although FIG. 6 illustrates that two ADAS modes are recommended, examples of providing the ADAS modes are not limited thereto.

Referring to FIG. 7, the pop-up window P of the mode recommendation screen may output an explanation regarding the recommendable ADAS mode together with the ADAS mode. In other words, by outputting guide messages or execution methods together with the ADAS mode, the driver may more efficiently understand functions provided by the vehicle 100. The method of providing the ADAS mode recommendation screen is not limited to those illustrated in FIGS. 6 and 7. In other words, the ADAS mode recommendation screen may be output as a head-up display as illustrated in FIG. 8 or output on an instrument cluster of the vehicle 100 as illustrated in FIG. 9.

Moreover, referring to FIG. 10, the method of controlling the vehicle 100 according to another exemplary embodiment may include receiving traffic information by the communication unit 175 (240), determining a recommendable ADAS mode based on the traffic information (250), and outputting the determined ADAS mode (260). The method of controlling the vehicle 100 illustrated in FIG. 10 is different from the method of controlling the vehicle 100 illustrated in FIG. 5 in that the method of FIG. 10 determines the recommendable ADAS mode based on traffic information received by the communication unit 175 instead of the behavior information of the driver. Hereinafter, the method will be described focusing on differences from the method of controlling the vehicle 100 of FIG. 5 for descriptive convenience.

The method of controlling the vehicle 100 according to the present exemplary embodiment may include receiving traffic information by the communication unit 175 (240). More particularly, the communication unit 175 may be configured to receive external traffic information from a traffic information collecting device or external traffic information from a server of the ITS. Hereinafter, descriptions of the traffic information collecting device and the ITS presented above will not be repeated herein.

Further, referring to FIG. 11, the method of controlling the vehicle 100 according to another exemplary embodiment may include collecting behavior information of the driver (210), receiving traffic information by the communication unit 175 (240), determining a recommendable ADAS mode based on the behavior information and the traffic information (260), and outputting the determined ADAS mode (230). The method of controlling the vehicle 100 illustrated in FIG. 11 is different from the methods of controlling the vehicle 100 illustrated in FIGS. 5 and 10 in that the method of FIG. 11 determines the recommendable ADAS mode based on the behavior information of the driver and the traffic information received by the communication unit 175. In this regard, descriptions presented above will not be repeated herein.

As is apparent from the above description, according to the vehicle and the method of controlling the same according to exemplary embodiments of the present disclosure, ADAS functions suitable for driving situations may be recommended, and methods of using the functions may be provided. Thus, driving safety of the driver may be improved.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
   a collection unit configured to collect behavior information of a driver;
   a communication unit configured to receive traffic information from an external traffic information collecting device;
   a controller configured to determine a driver assistance mode recommendable to the driver based on the collected behavior information and the received traffic information; and
   an output unit configured to output the determined driver assistance mode,
   wherein the collection unit is configured to collect information regarding whether a noise or vibration occurs in a front passenger seat or back seats and a corresponding noise or vibration occurrence time, information regarding whether the driver gazes at a side mirror or a rear view mirror, information regarding an angle of a steering wheel, information regarding whether an accelerator or a brake pedal is engaged and a corresponding operating time of the accelerator or the brake pedal, and information regarding whether a multimedia is manipulated and a corresponding manipulation time.

2. The vehicle according to claim 1, wherein the collection unit includes a sound collecting unit, an image collecting unit, a pressure sensor, a heat sensor, a force sensor, a heart rate sensor, and a humidity sensor.

3. The vehicle according to claim 1, wherein the output unit is configured to output an explanation regarding the driver assistance mode.

4. The vehicle according to claim 1, wherein the output unit includes at least one selected from the group consisting of a display unit and a sound output unit.

5. The vehicle according to claim 1, wherein the traffic information collecting device includes at least one selected from a group consisting of an image sensing device, a vehicle detection system (VDS), a fire detector, and smoke removing facilities.

6. The vehicle according to claim 1, wherein the communication unit is configured to receive traffic information from a server of a transport system (TS).

7. The vehicle according to claim 1, wherein the controller is configured to determine at least one driver assistance mode selected from a group consisting of: Cruise Control (CC), Lane Keeping Assist System (LKAS), Parking Assist System (PAS), Traffic Jam Assist (TJA), Autonomous Emergency Braking System (AEB), Highway Driving Assist (HAD), Forward Collision Warning System (FCWS), Emergency Stop System (ESS), Hill Start Assist Control System (HAC), Lane Departure Warning System (LDWS), Blind Spot Detection (BSD), and Narrow Path Assist (NPA) modes, based on the collected behavior information.

8. A method of controlling a vehicle, comprising:
   collecting, by a plurality of sensors, behavior information of a driver;
   receiving, by a communication unit, traffic information from an external traffic information collecting device;
   determining, by a controller, a driver assistance mode recommendable to the driver based on the collected behavior information and the received traffic information; and
   outputting, by the controller, the determined driver assistance mode,
   wherein the collecting of the behavior information of the driver includes collecting information regarding whether a noise or vibration occurs in a front passenger seat or back seats and a corresponding noise or vibration occurrence time, information regarding whether the driver gazes at a side mirror or a rear view mirror, information regarding an angle of a steering wheel information regarding whether an accelerator or a brake pedal is engaged and a corresponding operating time of the accelerator or the brake pedal, and information regarding whether a multimedia is manipulated and a corresponding manipulation time.

9. The method according to claim 8, wherein the collecting of the behavior information of the driver includes determining behavior information of the driver based on pre-stored behavior information of the driver.

10. The method according to claim 8, wherein the outputting of the determined driver assistance mode includes outputting the driver assistance mode and explanations about the driver assistance mode.

11. The method according to claim 8, wherein the external traffic information collecting device includes a server of a transport system (TS).

12. The method according to claim 8, wherein the determining of the driver assistance mode recommendable to the driver based on the collected behavior information includes determining a at least one driver assistance mode selected from a group consisting of: Cruise Control (CC), Lane Keeping Assist System (LKAS), Parking Assist System (PAS), Traffic Jam Assist (TJA), Autonomous Emergency Braking System (AEB), Highway Driving Assist (HAD), Forward Collision Warning System (FCWS), Emergency Stop System (ESS), Hill Start Assist Control System (HAC), Lane Departure Warning System (LDWS), Blind Spot Detection (BSD), and Narrow Path Assist (NPA) modes, based on the collected behavior information.

* * * * *